(12) United States Patent
Henry et al.

(10) Patent No.: US 6,988,172 B2
(45) Date of Patent: Jan. 17, 2006

(54) MICROPROCESSOR, APPARATUS AND METHOD FOR SELECTIVELY ASSOCIATING STORE BUFFER CACHE LINE STATUS WITH RESPONSE BUFFER CACHE LINE STATUS

(75) Inventors: Glenn Henry, Austin, TX (US); Rodney Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 389 days.

(21) Appl. No.: 10/422,055

(22) Filed: Apr. 25, 2003

(65) Prior Publication Data

US 2003/0225980 A1 Dec. 4, 2003

Related U.S. Application Data

(60) Provisional application No. 60/376,462, filed on Apr. 29, 2002.

(51) Int. Cl.
*G06F 12/00* (2006.01)

(52) U.S. Cl. ..................... 711/144; 711/141

(58) Field of Classification Search ......... 711/141–145
See application file for complete search history.

(56) References Cited

U.S. PATENT DOCUMENTS

| | | | | |
|---|---|---|---|---|
| 5,642,494 A | * | 6/1997 | Wang et al. | 711/140 |
| 5,652,859 A | * | 7/1997 | Mulla et al. | 711/146 |
| 5,680,572 A | | 10/1997 | Akkary et al. | |
| 6,205,520 B1 | * | 3/2001 | Palanca et al. | 711/138 |
| 6,321,303 B1 | * | 11/2001 | Hoy et al. | 711/140 |

* cited by examiner

*Primary Examiner*—B. James Peikari
*Assistant Examiner*—Woo H. Choi
(74) *Attorney, Agent, or Firm*—E. Alan Davis; James W. Huffman

(57) ABSTRACT

A microprocessor with an apparatus for alleviating the need to maintain coherency between cache line status of a store buffer and a response buffer each storing the same cache line address is disclosed. The store buffers include match bits. When a store operation requires a response buffer to be allocated (e.g., to receive a cache line implicated by a store miss of a write-allocate cache or to obtain exclusive ownership of a shared cache line hitting in the cache), control logic populates the match bits to specify which of the response buffers was allocated. Control logic updates the cache line status in the allocated response buffer as status-altering events occur, which is subsequently used to update the cache, thereby alleviating the need for the store buffer to maintain the cache line status. If the store address matches an already-allocated response buffer, that response buffer is specified in the match bits.

27 Claims, 2 Drawing Sheets

Microprocessor with Store/Response Buffer Cache Line Status Associating Apparatus

*Microprocessor with Store/Response Buffer Cache Line Status Associating Apparatus*

Data Cache Operation

MICROPROCESSOR, APPARATUS AND METHOD FOR SELECTIVELY ASSOCIATING STORE BUFFER CACHE LINE STATUS WITH RESPONSE BUFFER CACHE LINE STATUS

PRIORITY INFORMATION

This application claims priority based on U.S. Provisional Application Ser. No. 60/376,462, filed Apr. 29, 2002, entitled APPARATUS AND METHOD FOR ASSOCIATING STORE BUFFER CACHE LINE STATUS WITH RESPONSE BUFFER CACHE LINE STATUS.

FIELD OF THE INVENTION

This invention relates in general to the field of cache memories, and particularly to maintaining cache coherency in microprocessors employing store buffers and response buffers.

BACKGROUND OF THE INVENTION

A significant portion of the operations performed by microprocessors is to read data from or write data to memory. Reading data from memory is commonly referred to as a load, and writing data to memory is commonly referred to as a store. Typically, a microprocessor generates load and store operations in response to an instruction that accesses memory. Load and store operations can also be generated by the microprocessor for other reasons necessary to the operation of the microprocessor, such as loading page table information, or evicting a cache line to memory.

Because accesses to memory are relatively slow compared to other operations within the microprocessor, modern microprocessors employ cache memories. A cache memory, or cache, is a memory in the microprocessor that stores a subset of the data in the system memory and is typically much smaller than the system memory. Transfers of data with the microprocessor's cache are much faster than the transfers of data between the microprocessor and memory. When a microprocessor reads data from the system memory, the microprocessor also stores the data in its cache so the next time the microprocessor needs to read the data it can more quickly read from the cache rather than having to read the data from the system memory. Similarly, the next time the microprocessor needs to write data to a system memory address whose data is stored in the cache, the microprocessor can simply write to the cache rather than having to write the data immediately to memory, which is commonly referred to as write-back caching. This ability to access data in the cache, thereby prolonging the need to access memory, greatly improves system performance by reducing the overall data access time.

Caches store data in cache lines. A common cache line size is 32 bytes. A cache line is the smallest unit of data that can be transferred between the cache and the system memory. That is, when a microprocessor wants to read a cacheable piece of data from memory, it reads all the data in the cache line containing the piece of data and stores the entire cache line in the cache. Similarly, when a new cache line needs to be written to the cache that causes a modified cache line to be replaced, the microprocessor writes the entire replaced line to memory.

Modern caches are typically pipelined. That is, the caches are comprised of multiple stages coupled together to form a pipeline. To perform a store operation to a cache typically requires two or more passes through the cache pipeline. During the first pass, the memory address of the store operation is provided to the cache to determine whether the address is present, i.e., cached, in the cache and if so, the status of the cache line associated with the store address. During the second pass, the data of the store operation is written into the cache.

To accommodate the two-pass nature of a cache, microprocessors typically employ store buffers to hold the store data and store address for use in the second pass. In addition, the cache is typically a resource accessed by multiple functional blocks within the microprocessor; consequently, the functional blocks must arbitrate for access to the cache. The store buffers also serve the purpose of holding the store data and address until the store operation wins arbitration for the cache to perform the store.

When a store operation address hits in the cache, the data can typically be written to the cache line immediately. However, if the store address misses the cache, the data cannot be immediately written to the cache. This is because the store data is almost always less than a full cache line and, as mentioned above, a cache line is the smallest unit of data than can be transferred between the cache and the system memory. If the store data were written to the cache without the remaining bytes of the cache line present in the cache, the cache would later have to write a partial cache line to memory, which is not permitted.

One solution is simply to write the store data to memory and not to the cache, i.e., to cache only loads. However, another solution is to first read the cache line implicated by the store address from memory, merge the store data with the cache line, and then store the updated cache line to the cache. This type of cache is commonly referred to as a write-allocate cache, since space for a cache line is allocated in the cache on write operations that miss in the cache.

Modern microprocessors commonly include buffers to receive data read from memory, such as cache lines read from memory for a write-allocate operation. These buffers are commonly referred to as response buffers.

Modern computer systems commonly employ multiple microprocessors and/or multiple levels of cache. For example, each microprocessor may include level-one (L1) and level-two (L2) caches. Furthermore, the caches at each level may be separated into distinct instruction caches and data caches. The presence of multiple microprocessors and/or caches that cache data from a shared memory introduces a problem of cache coherence. That is, the view of memory that one microprocessor sees through its cache may be different from the view another microprocessor sees through its cache. For example, assume a location in memory denoted X contains a value of 1. Microprocessor A reads from memory at address X and caches the value of 1 into its cache. Next, microprocessor B reads from memory at address X and caches the value of 1 into its cache. Then microprocessor A writes a value of 0 into its cache and also updates memory at address X to a value of 0. Now if microprocessor A reads address X it will receive a 0 from its cache; but if microprocessor B reads address X it will receive a 1 from its cache.

In order to maintain a coherent view of memory through the different caches, microprocessors commonly employ a cache coherency protocol, in which a cache line status value is maintained for each cache line. An example of a popular and well-documented cache coherency status protocol is the MESI protocol. MESI stands for Modified, Exclusive, Shared, Invalid, which are the four possible states or status values of a cache line.

Both store buffers and response buffers keep a cache line status for the cache lines they hold, just as caches keep a cache line status for each of the cache lines they hold. While a cache line resides in a cache, store buffer, and/or response buffer, events may occur that require the status of the cache line to be updated. One example of a cache line status-altering event is an eviction of a cache line from a cache. A cache line may be evicted because it is the least-recently-used cache line to make room in the cache for a new cache line, for example. The status of an evicted cache line is updated to Invalid.

Another example of an event requiring update of cache line status is a snoop operation. Many systems are designed to perform snoop operations as part of the cache coherency protocol. Each cache monitors, or snoops, every transaction on the microprocessor bus to determine whether or not the cache has a copy of the cache line implicated by the bus transaction initiated by another microprocessor or by another cache within the microprocessor. The cache performs different actions depending upon the type of transaction snooped and the status of the cache line implicated. The snoop operation may be an invalidate snoop, in which case the MESI state must be updated to Invalid. Or, the snoop may be a shared snoop, in which case the MESI state may be updated to Shared.

As discussed above, under some conditions, such as when the store misses in a write-allocate cache, a response buffer will be allocated to receive the implicated cache line, either from system memory of from a lower-level cache. If the store was one that caused a response buffer to be allocated, then the cache line status is kept coherent between the store buffer and response buffer as status-altering events occur. Prior processors have included logic to update both the store buffer cache line status and the response buffer cache line status when one of these events occurs.

The main disadvantage of the prior method is that the logic to update the MESI state in both the store buffer and response buffer is complex. This is particularly true as the number of buffers increases. The complexity is disadvantageous in at least three aspects.

First, the complexity is error-prone in its design. That is, it is easy to design bugs into the update logic and difficult to test for all the possible combinations of conditions and events that might occur in order to find the bugs. Second, the complexity implies larger control circuitry, which consumes undue chip real estate, which may in turn affect chip yields. Third, the complexity may impact critical timing paths that affect the clock speed at which the microprocessor may run. Therefore, what is needed is a means of reducing the complexity of maintaining cache line status coherency associated with store operations.

SUMMARY

The present invention provides an apparatus and method for associating the store buffer MESI state with the response buffer MESI state until the store is retired into the cache so that only the response buffer MESI state has to be maintained. A small number of Match bits are provided in the store buffer, which indicate the store buffer address matches the response buffer address and therefore the response buffer MESI state can be used when retiring the store to the cache, thereby alleviating the need to maintain the MESI state in the store buffer when a response buffer has been allocated.

Accordingly, in attainment of the aforementioned object, it is a feature of the present invention to provide an apparatus in a microprocessor having a cache, a store buffer, and a plurality of response buffers, for alleviating the need to maintain coherency between cache line status of the store buffer and cache line status of one of the plurality of response buffers if the response buffer holds the same cache line address. The apparatus includes a plurality of match bits that specify an association, if any, between the store buffer and one of the plurality of response buffers holding a same cache line address, if any. The apparatus also includes control logic, coupled to the plurality of match bits, which update the cache in response to a store operation. If the plurality of match bits specifies an association between the store buffer and one of the plurality of response buffers, then the control logic updates the cache with cache line status stored in the associated one of the plurality of response buffers. Otherwise, the control logic updates the cache with cache line status stored in the store buffer.

In another aspect, it is a feature of the present invention to provide in a microprocessor having a cache, a store buffer, and response buffers, an apparatus for alleviating the need to maintain cache line status coherency between the store buffer and the response buffers. The apparatus includes event signals that specify one or more events affecting a status of a cache line implicated by a store operation to the cache. The apparatus also includes first control logic, coupled to receive the event signals, which allocates one of the response buffers for said store operation and maintains the status in the allocated one of the response buffers in response to the event signals. The apparatus also includes second control logic, coupled to the first control logic, which generates a control value to specify the allocated one of the response buffers maintaining the status of the cache line. The apparatus also includes third control logic, coupled to receive the control value. The third control logic determines from the control value which of the response buffers to receive the status from and to update the cache with.

In another aspect, it is a feature of the present invention to provide a microprocessor. The microprocessor includes a plurality of response buffers. Each of the response buffers has a first portion for storing first cache line status. The microprocessor also includes a store buffer with a second portion for storing second status of a cache line implicated by a store operation and a third portion for storing association information. The microprocessor also includes control logic, coupled to the store buffer, which selectively maintains the second status based on the association information. The control logic does not maintain the second status if the association information indicates one of the plurality of response buffers is maintaining the first cache line status in the first portion.

In another aspect, it is a feature of the present invention to provide a microprocessor. The microprocessor includes a write-allocate cache and a plurality of response buffers, coupled to the cache. Each of the plurality of response buffers receives a cache line allocated for a store operation missing in the cache and maintains a coherency status of the cache line. The microprocessor also includes a plurality of store buffers. Each of the plurality of store buffers stores an address specified by one of the store operations and stores match information specifying which of the plurality of response buffers is maintaining the coherency status of the cache line implicated by the store operation address. The microprocessor also includes control logic, coupled to the plurality of response buffers, which updates the cache with the coherency status of one of the plurality of response buffers specified by the match information in response to reception of the cache line into the specified one of the response buffers.

In another aspect, it is a feature of the present invention to provide a method in a microprocessor for alleviating the need to maintain coherency of cache line status between a store buffer and one of a plurality of response buffers if the store buffer and the one of the plurality of response buffers store the same cache line address specified by a store operation. The method includes determining whether the store operation needs a response buffer, populating match bits to specify that none of the plurality of response buffers is maintaining cache line status for a cache line implicated by the store operation if the store operation does not need a response buffer, and populating the match bits to specify which one of the plurality of response buffers is maintaining the cache line status for the cache line if the store operation does need a response buffer.

In another aspect, it is a feature of the present invention to provide a computer data signal embodied in a transmission medium. The computer data signal includes computer-readable program code for providing a microprocessor. The program code includes a first program code for providing a plurality of response buffers. Each of the plurality of response buffers has a first portion for storing first cache line status. The program code also includes a second program code for providing a store buffer that has a second portion for storing second status of a cache line implicated by a store operation and a third portion for storing association information. The program code also includes a third program code for providing control logic, coupled to the store buffer, which selectively maintains the second status based on the association information. The control logic does not maintain the second status if the association information indicates one of the plurality of response buffers is maintaining the first cache line status in the first portion.

An advantage of the present invention is a reduction in the complexity of the logic required to maintain the MESI state of a cache line implicated by a store operation. This is particularly true as the number of store buffers increases. The complexity reduction provides the benefits of a potentially reduced number of design errors; smaller control circuitry, and hence reduced chip real estate and increased chip yields; and potentially improved critical timing paths for increased microprocessor clock speed. The advantage is obtained at the small cost of adding the match bits and associated logic to generate and examine the Match bits.

Other features and advantages of the present invention will become apparent upon study of the remaining portions of the specification and drawings.

DETAILED DESCRIPTION

Figure 1:
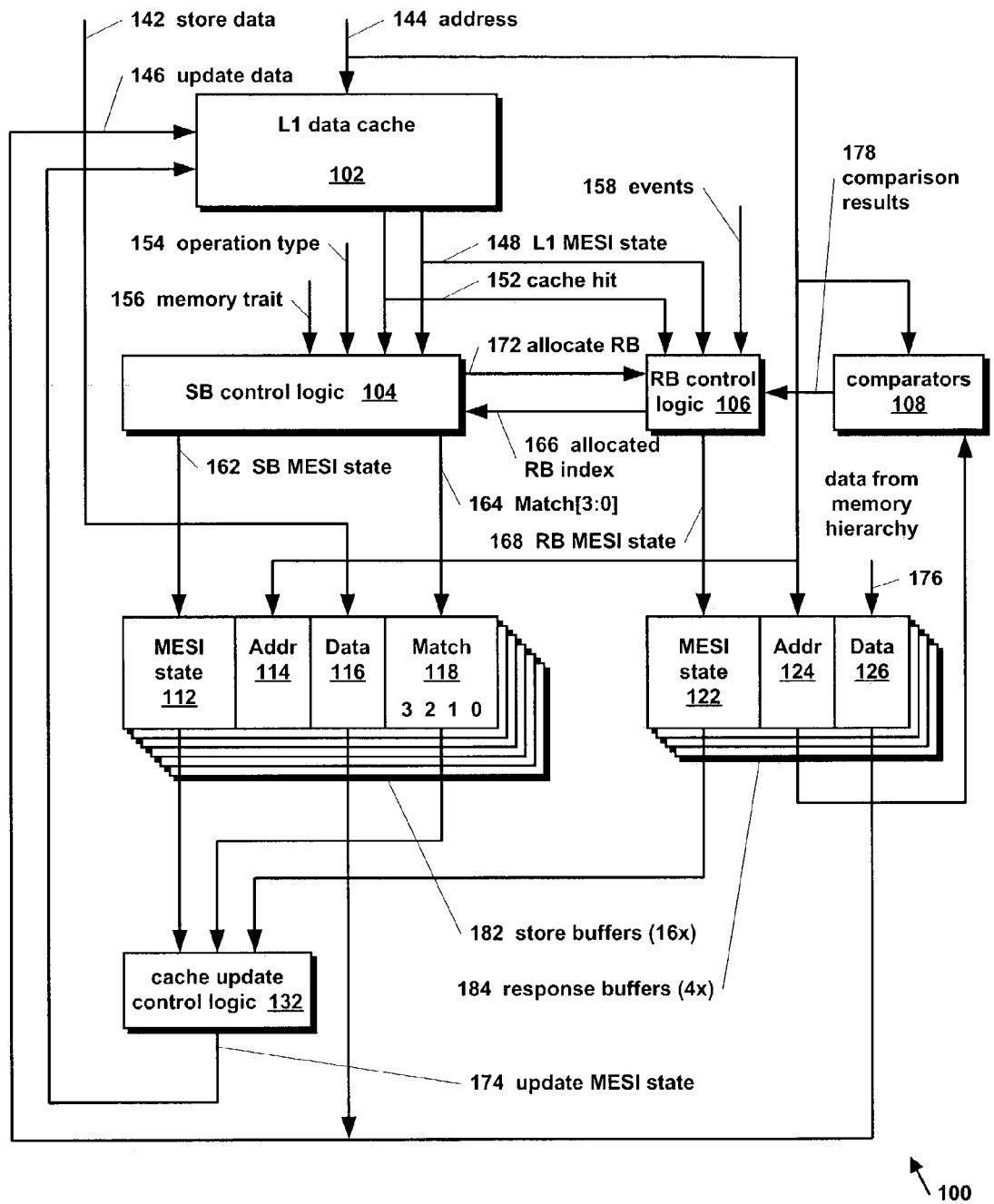
FIG. 1 is a block diagram of a microprocessor including an apparatus for selectively associating store buffer cache line status with response buffer cache line status according to the present invention.

Referring now to FIG. 1, a block diagram of a microprocessor 100 including an apparatus for selectively associating store buffer cache line status with response buffer cache line status according to the present invention is shown. Microprocessor 100 is a pipelined microprocessor having a plurality of pipeline stages. Microprocessor 100 includes a level-one (L1) data cache 102, a plurality of store buffers (SB) 182, store buffer control logic 104, a plurality of response buffers (RB) 184, response buffer control logic 106, comparators 108, and cache update control logic 132.

In one embodiment, the L1 data cache 102 is a 64 KB 4-way set associative cache. Cache 102 receives an address 144 specified by an operation, such as a store, load, or snoop. During read cycles, cache 102 performs a lookup of the address 144 and generates a cache hit signal 152 with a true value if the address 144 is present in cache 102 and a false value otherwise. If the address 144 is present in cache 102, the cache 102 outputs a status 148 of the cache line specified by the address 144. In one embodiment, the L1 MESI status 148 stored in cache 102 conforms substantially to the Modified/Exclusive/Shared/Invalid (MESI) cache coherency protocol. During a write cycle, cache 102 updates an entry specified by the address 144 with update data 146 and/or update MESI state 174.

SB control logic 104 receives L1 MESI status 148 and cache hit signal 152 from L1 data cache 102. SB control logic 104 also receives an operation type signal 154 and a memory trait signal 156. Operation type signal 154 indicates whether the operation associated with address 144 is a store, load, snoop, etc. Memory trait signal 156 indicates the trait of the memory region to which the operation is directed, i.e., the trait of the memory region in which the address 144 lies. Examples of memory traits are write-back, write-protected, non-cacheable, etc.

In one embodiment, microprocessor 100 includes sixteen store buffers 182. Store buffers 182 hold store data 142 associated with a store operation until the store data 142 can be written into cache 102. Each store buffer 182 includes an address portion 114 that receives and stores address 144 specified by a store operation. Each store buffer 182 includes a data portion 116 that receives and stores store data 142 specified by a store operation. Each store buffer 182 includes a status portion 112 for storing cache line status associated with the data stored in data portion 116.

In one embodiment, microprocessor 100 includes four response buffers 184. Response buffers 184 hold data 176, such as cache lines, received from an element of the system memory hierarchy, such as system memory or a level-2 cache. In one embodiment, cache 102 is a write-allocate cache. Hence, if store address 144 misses in cache 102, a response buffer 184 is allocated to receive from the memory hierarchy the cache line implicated by the missing store address 144. The store data 116 held in the store buffer 182 is then merged with the cache line held in the response buffer 184 and written to cache 102. Each response buffer 184 includes an address portion 124 that receives and stores address 144 of a store operation. Each response buffer 184 includes a data portion 126 that receives and stores the received data 176. Each response buffer 184 includes a status portion 122 for storing cache line status associated with the cache line stored in data portion 126.

Each store buffer 182 also includes Match bits 118. Match bits 118 are control bits that store control values for specifying an association, if any, between the store buffer 182 and one of the response buffers 184 holding the same cache line address in address portions 114 and 124, if any. As explained below, Match bits 118 are association information that indicates one of the response buffers 184 is maintaining the cache line status in its MESI state portion 122. In one embodiment, the number of Match bits 118 equals the number of response buffers 184. In the embodiment of FIG. 1, there are four Match bits 118 per store buffer 182, denoted 0 through 3, corresponding to the four response buffers 184. Match bits 118 are used to selectively associate the store buffer 182 MESI state 112 with the MESI state 122 stored in the response buffer 184 whose corresponding Match bit 118 is set. As described below, if one of the Match bits 118 is set, cache update control logic 132 uses the MESI state 122 of the associated response buffer 184 specified by the Match bits 118 to update cache 102 to complete a store operation rather than using the MESI state 112 of the store buffer 182. In the embodiment of FIG. 1, only one, if any, of the Match bits 118 will be set at a time. The Match bits 118 indicate which, if any, of the response buffers 184 is associated with the store buffer 182. That is, for example, if Match[2] 118 is set, then response buffer[2] 184 is associated with the store operation contained in the store buffer 182, and in particular, response buffer[2] 184 contains the current MESI state of the cache line implicated by the store operation.

Store buffer control logic 104 generates Match bits on Match[3:0] signal 164 for storage in the Match bits portion 118 of store buffers 182. In addition, store buffer control logic 104 generates the initial cache line status on SB MESI state signal 162 for storage in the MESI state 112 portion of store buffers 182.

Furthermore, store buffer control logic 104 determines when a response buffer 184 needs to be allocated and asserts a true value on an allocate RB signal 172. The allocate RB signal 172 is provided to response buffer control logic 106 to request a response buffer 184. Response buffer control logic 106 returns the index of the allocated response buffer 184 on allocated RB index signal 166. Response buffer control logic 106 keeps track of which of the response buffers 184 are free, and when requested to allocate a response buffer 184 returns the index of a free response buffer 184; however, response buffer control logic 106 returns the index of an already-allocated response buffer 184 if the store operation address 144 matches an address 124 of an already-allocated response buffer 184, as described below.

Store buffer control logic 104 generates the SB MESI state 162 and Match[3:0] bits 164 based on its inputs according to the following pseudo-code shown in Table 1.

TABLE 1

```
if (RB allocation not required)
{
    SB MESI state = L1 MESI state;
    Match[3:0] = b'0000;   /* don't need to associate SB with RB */
} else {
    SB MESI state = X;     /* don't care; */
    if (allocated RB index == 0)      /* RB 0 was allocated */
        Match[3:0] = b'0001;
    else if (allocated RB index == 1) /* RB 1 was allocated */
        Match[3:0] = b'0010;
    else if (allocated RB index == 2) /* RB 2 was allocated */
        Match[3:0] = b'0100;
    else if (allocated RB index == 3) /* RB 3 was allocated */
        Match[3:0] = b'1000;
}
```

Response buffer control logic 106 receives L1 MESI state 148 and cache hit signal 152. Response buffer control logic 106 generates the initial value of RB MESI state 168 based on L1 MESI state 148 and cache hit signal 152 and writes the initial RB MESI state 168 into the response buffer 184 specified by allocated RB index 166. If cache hit signal 152 is true, then response buffer control logic 106 writes the L1 MESI state 148 into the response buffer 184 MESI state 122; otherwise, response buffer control logic 106 writes an Invalid value into the response buffer 184 MESI state 122.

In addition, response buffer control logic 106 receives event signals 158. Event signals 158 indicate the occurrence of events that affect the cache line status of the cache line implicated by the store address held in address portion 124, and response buffer control logic 106 updates the MESI state 122 based upon the events 158. The following pseudo-code shown in Table 2 describes how response buffer control logic 106 operates to update the MESI state 122 as MESI state-changing events occur.

TABLE 2

```
if (events == invalidating snoop)
    RB MESI state = INVALID;
else if (events == sharing snoop)
    RB MESI state = SHARED;
else if (events == eviction of the cache line)
    RB MESI state = INVALID;
else if (events == ownership of cache line obtained)
    RB MESI state = EXCLUSIVE;
else if (events == cache line arrived in RB)
    RB MESI state = EXCLUSIVE;
```

In one embodiment, comparators 108 include four comparators corresponding to the four response buffers 184. Each of the comparators 108 compares operation address 144 with the address portion 124 of a corresponding one of the four response buffers 184 to generate four comparison result signals 178. A comparison result signal 178 is true if the store address 144 matches the address 124 in the corresponding response buffer 184. If store buffer control logic 104 asserts allocate response buffer signal 172, and one of the comparison result signals 178 is true, then response buffer control logic 106 specifies the corresponding response buffer 184 on allocated RB index signal 166; otherwise, response buffer control logic 106 specifies the next free response buffer 184 on allocated RB index signal 166. A scenario where one of the comparison result signals 178 is true is when two successive store operations implicate the same cache line.

In this scenario, the first store operation has set its appropriate Match bit 118 in its store buffer 182 to associate the store buffer 182 MESI state 112 with the allocated response buffer 184 MESI state 122 and is waiting for the cache line to return into the response buffer 184. A second store operation to the same cache line, i.e., to the same store address 144, requests response buffer control logic 106 to allocate a response buffer 184. Response buffer control logic 106 detects that the second store operation implicates the same cache line as the first store operation and returns the index of the same response buffer 184. Consequently, the second store operation receives the benefit of the cache line being returned into the RB for the first operation, thereby alleviating the need to fetch the cache line again from memory. In this regard, the second operation enjoys similar benefits as if it had hit in cache 102. In addition, the precious response buffer 184 resources are used more efficiently, since another response buffer 184 is not allocated from the pool of free response buffers 184 for the second store operation.

Microprocessor 100 also includes cache update control logic 132, which receives the SB MESI state 112 from the store buffer 182 that is ready to update cache 102. In addition, cache update control logic 132 receives the RB MESI state 122 from each of the four response buffers 184.

Cache update control logic 132 also receives Match bits 118 from the updating store buffer 182.

Cache update control logic 132 selects either the SB MESI state 112 or the RB MESI state 122 for updating cache 102 based on Match bits 118 as described in the following pseudo-code shown in Table 3. Cache update control logic 132 updates cache 102 with the selected MESI state and/or appropriately merged store buffer 182 data 116 and response buffer 184 data 126.

TABLE 3

```
if (Match[0] == 1)
    update MESI state = RB[0] MESI state;
else if (Match[1] == 1)
    update MESI state = RB[1] MESI state;
else if (Match[2] == 1)
    update MEDI state = RB[2] MESI state;
else if (Match[3] == 1)
    update MESI state = RB[3] MESI state;
else    /* no Match bits set */
    update MESI state = SB MESI state;
```

Figure 2:
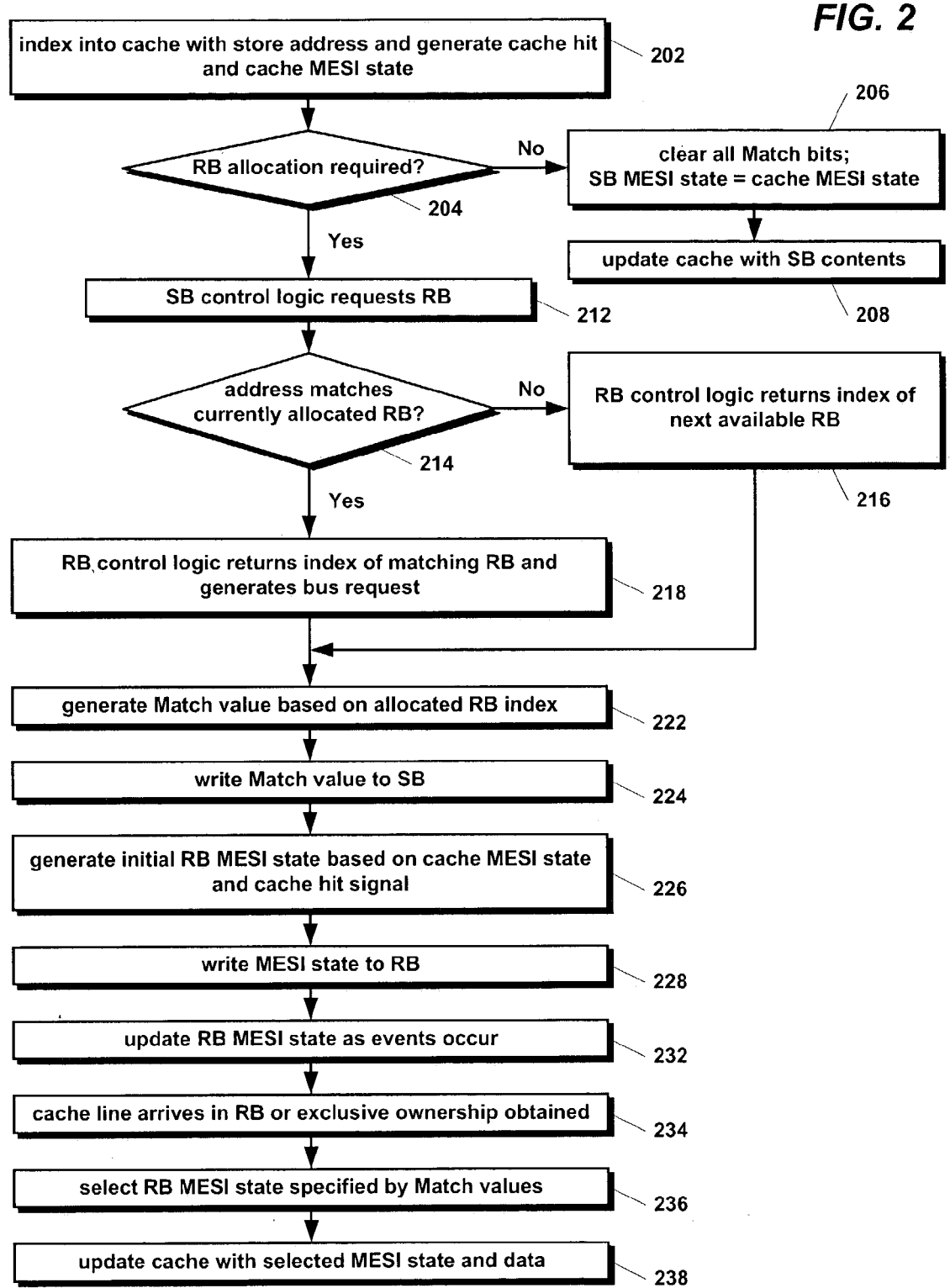
FIG. 2 is a flowchart illustrating operation of the microprocessor of FIG. 1 according to the present invention.

Referring now to FIG. 2, a flowchart illustrating operation of the microprocessor 100 of FIG. 1 according to the present invention is shown. Flow begins at block 202.

At block 202, a store operation proceeds down the microprocessor 100 pipeline and reaches cache 102 of FIG. 1. The store operation address 144 indexes into cache 102, which generates cache hit signal 152 and L1 MESI state 148 of FIG. 1. Flow proceeds from block 202 to decision block 204.

At decision block 204, store buffer control logic 104 of FIG. 1 determines whether a response buffer 184 of FIG. 1 needs to be allocated for the store operation. In one embodiment, a response buffer 184 allocation is required when cache hit signal 152 indicates a cache 102 miss occurs, when the L1 MESI state 148 is Invalid, or when cache hit signal 152 indicates a cache hit occurs with an L1 MESI state 148 of Shared, to a memory region type in which shared allocations are specified. In one embodiment in which the microprocessor 100 is an x86 microprocessor, shared store allocations are specified only in write-back memory regions. In the case where a cache hit 152 occurs with a shared L1 MESI state 148, a transaction must be performed on the microprocessor 100 bus to obtain exclusive ownership of the implicated cache line in order to modify the cache line. If a response buffer 184 allocation is not required, such as if the store address 144 hits in cache 102 with Exclusive or Modified status 148, then flow proceeds to block 206; otherwise, flow proceeds to block 212.

At block 206, store buffer control logic 104 of FIG. 1 allocates a store buffer 182 of FIG. 1 and generates a binary value of b'0000 on Match[3:0] signals 164 of FIG. 1 to clear all the Match bits 118 of FIG. 1 to indicate that the allocated store buffer 182 is not associated with any of the response buffers 184, as specified above in Table 1. In addition, store buffer control logic 104 of FIG. 1 provides the L1 MESI state 148 received from cache 102 on SB MESI state signals 162 of FIG. 1 for storage in MESI state 112 of FIG. 1 of the allocated store buffer 182, as specified above in Table 1. Furthermore, the store data 142 of FIG. 1 and store address 144 are stored into the data 116 and address 114 portions, respectively, of the store buffer 182. Flow proceeds from block 206 to block 208.

At block 208, cache update control logic 132 updates cache 102 with the contents of the store buffer 182, as specified in the "else" clause of Table 3 above. That is, cache update control logic 132 updates cache 102 with the data 116 and MESI state 112 stored in the store buffer 182 as the update MESI state 174 and update data 146, respectively, using the address 114 also stored therein. Flow ends at block 208.

At block 212, store buffer control logic 104 of FIG. 1 allocates a store buffer 182 and generates a true value on allocate RB signal 172 of FIG. 1 to request a response buffer 184. In addition, the store data 142 of FIG. 1 and store address 144 are stored into the data 116 and address 114 portions, respectively, of the allocated store buffer 182. Flow proceeds from block 212 to decision block 214.

At decision block 214, response buffer control logic 106 of FIG. 1 examines comparison result signals 178 of FIG. 1 to determine whether the store address 144 matches any currently allocated response buffer 184. If so, flow proceeds to block 218; otherwise, flow proceeds to block 216.

At block 216, response buffer control logic 106 returns the index of the next available response buffer 184 to store buffer control logic 104 on allocated response buffer index signal 166. Flow proceeds from block 216 to block 222.

At block 218, response buffer control logic 106 returns the index of the response buffer 184 corresponding to the true comparison result signal 178 to store buffer control logic 104 on allocated response buffer index signal 166. In addition, a microprocessor 100 bus request is generated, either to cause the implicated cache line to be fetched from memory into the allocated response buffer 184 or to obtain exclusive ownership of a shared cache line hitting in the cache 102. Flow proceeds from block 218 to block 222.

At block 222, store buffer control logic 104 generates a binary value on Match[3:0] signals 164 to set the appropriate Match bit 118 to indicate that the allocated store buffer 182 MESI state 112 is associated with the appropriate response buffer 184 MESI state 122, as specified above in Table 1. For example, if allocated response buffer index signal 166 specifies response buffer[3] 184, then store buffer control logic 104 generates a binary value of b'1000 on Match[3:0] signals 164. Flow proceeds from block 222 to block 224.

At block 224, the store buffer 182 allocated at block 212 stores the Match value specified on Match[3:0] signals 164 into Match bits 118. Flow proceeds from block 224 to block 226.

At block 226, response buffer control logic 106 generates initial cache line status on RB MESI state signal 168 equal to the L1 MESI state 148, unless a cache miss was indicated on cache hit signal 152, in which case the initial cache line RB MESI state 168 is Invalid. Flow proceeds from block 226 to block 228.

At block 228, the cache line status generated on RB MESI state signal 168 at block 226 is stored into the allocated response buffer 184 MESI state 122 portion. In addition, the store address 144 is stored into the address 124 portion of the response buffer 184. Flow proceeds from block 228 to block 232.

At block 232, response buffer control logic 106 updates the MESI state 122 of the response buffer 184 as events indicated on events signal 158 of FIG. 1 occur, as specified above in Table 2. Flow proceeds from block 232 to block 234.

At block 234, the microprocessor 100 bus cycle requested at block 218 completes, and the requested cache line arrives from memory into the allocated response buffer 184 or exclusive ownership of the cache line is obtained, depending upon what purpose the response buffer 184 was allocated for during block 212. Flow proceeds from block 234 to block 236.

At block 236, cache update control logic 132 examines the Match bits 118 from the allocated store buffer 182 to select the MESI state 122 from the response buffer 184 specified by the Match bits 118 as the update MESI state 174, as specified in Table 3 above. Flow proceeds from block 236 to block 238.

At block 238, cache update control logic 132 updates cache 102 with the MESI state selected at block 236 and with the data 116 stored in the allocated store buffer 182. If the response buffer 184 allocated at block 212 was associated with a write-allocate operation, then the store buffer 182 store data 116 is merged with the response buffer 184 cache line data 126 to update cache 102. That is, cache update control logic 132 updates cache 102 with the merged data 116 and 126, and MESI state 122 stored in the response buffer 184 specified by the Match bits 118 as the update MESI state 174 and update data 146, respectively, using the address 124 also stored in the specified response buffer 184. Flow ends at block 238.

Although the present invention and its objects, features, and advantages have been described in detail, other embodiments are encompassed by the invention. For example, although the present invention has been described in association with an L1 data cache, the invention is adaptable to use in association with other types of caches. Furthermore, the encoding of the Match bits to specify the associated response buffer may be adapted in any of various manners. Additionally, although embodiments are described in which response buffers are allocated to fetch cache lines missing in a write-allocate cache and to obtain ownership of a shared cache line, the invention is adaptable for use when other conditions associated with a store operation require the allocation of a response buffer. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. An apparatus in a microprocessor having a cache, a store buffer, and a plurality of response buffers, for alleviating the need to maintain coherency between cache line status of the store buffer and cache line status of one of the plurality of response buffers if the response buffer holds the same cache line address, the apparatus comprising:

a plurality of match bits, for specifying an association, if any, between the store buffer and one of the plurality of response buffers holding a same cache line address, if any; and control logic, coupled to said plurality of match bits, for updating the cache in response to a store operation, wherein if said plurality of match bits specifies an association between the store buffer and one of the plurality of response buffers, then said control logic updates the cache with cache line status stored in said associated one of the plurality of response buffers, and otherwise updates the cache with cache line status stored in the store buffer.

2. The apparatus of claim 1, further comprising:

second control logic, coupled to said plurality of match bits, for populating said plurality of match bits to specify said association if said cache line address misses in a write-allocate cache of the microprocessor.

3. The apparatus of claim 2, wherein said one of the plurality of response buffers specified by said plurality of match bits is allocated for receiving a cache line specified by said cache line address.

4. The apparatus of claim 1, further comprising:

second control logic, coupled to the match bits, for populating said plurality of match bits to specify said association if said cache line address hits in a cache of the microprocessor, wherein said cache indicates said cache line has a shared status.

5. The apparatus of claim 4, wherein said one of the plurality of response buffers specified by said plurality of match bits is allocated for obtaining exclusive ownership of a cache line specified by said cache line address.

6. The apparatus of claim 1, wherein said cache line status substantially conforms to a Modified/Exclusive/Shared/Invalid (MESI) cache coherency protocol.

7. An apparatus in a microprocessor having a cache, a store buffer, and response buffers, the apparatus for alleviating the need to maintain cache line status coherency between the store buffer and the response buffers, the apparatus comprising:

event signals, for specifying one or more events affecting a status of a cache line implicated by a store operation to the cache;

first control logic, coupled to receive said event signals, for allocating one of the response buffers for said store operation, and for maintaining said status in said allocated one of the response buffers in response to said event signals;

second control logic, coupled to said first control logic, for generating a control value to specify said allocated one of the response buffers maintaining said status of said cache line; and third control logic, coupled to receive said control value, and to determine therefrom which of the response buffers to receive said status from and to update the cache therewith.

8. The apparatus of claim 7, wherein a portion of the store buffer stores a second cache line status of said cache line implicated by said store operation, wherein said second control logic does not maintain said second cache line status of said cache line if said control value indicates one of the response buffers is maintaining said status of said cache line.

9. The apparatus of claim 8, wherein said second control logic does maintain said second cache line status of said cache line if said control value indicates none of the response buffers is maintaining said status of said cache line.

10. The apparatus of claim 7, wherein said control value comprises a plurality of bits for specifying zero or one of the response buffers.

11. The apparatus of claim 7, wherein said cache line status comprises cache coherency status information substantially conforming to a Modified/Exclusive/Shared/Invalid (MESI) protocol.

12. The apparatus of claim 7, further comprising:
a plurality of comparators, coupled to the response buffers, for comparing a store address specified by said store operation with a corresponding plurality of cache line addresses stored in the response buffers.

13. The apparatus of claim 12, wherein said first control logic allocates a free one of the response buffers if said plurality of comparators indicates said store address does not match any of said corresponding plurality of cache line addresses stored in the response buffers.

14. The apparatus of claim 12, wherein if said plurality of comparators indicates said store address matches one of said corresponding plurality of cache line addresses stored in the response buffers, then said first control logic allocates said matching one of the response buffers.

15. A microprocessor, comprising:
a plurality of response buffers, each having a first portion for storing first cache line status;
a store buffer, having a second portion for storing second status of a cache line implicated by a store operation, and a third portion for storing association information; and
control logic, coupled to said store buffer, for selectively maintaining said second status based on said association information, wherein said control logic does not maintain said second status if said association information indicates one of said plurality of response buffers is maintaining said first cache line status in said first portion.

16. The microprocessor of claim 15, further comprising:
second control logic, coupled to said store buffer, for updating a cache in the microprocessor, wherein said second control logic updates said cache with said first cache line status maintained in said first portion of said allocated one of said plurality of response buffers if said association information indicates said one of said plurality of response buffers is maintaining said first cache line status in said first portion.

17. The microprocessor of claim 16, wherein said second control logic updates said cache with said second status of said cache line in said second portion of said store buffer if said association information indicates none of said plurality of response buffers is maintaining said first cache line status in said first portion.

18. The microprocessor of claim 15, wherein said cache line status specifies one of four states of said cache line: Modified, Exclusive, Shared, or Invalid.

19. The microprocessor of claim 15, wherein each of said plurality of response buffers includes a fourth portion for storing a memory address and said store buffer includes a fifth portion for storing a memory address of said implicated cache line.

20. The microprocessor of claim 19, wherein said association information indicates one of said plurality of response buffers is maintaining said first cache line status in said first portion if said memory address of said implicated cache line stored in said fifth portion of said store buffer matches said memory address stored in said fourth portion of allocated one of said plurality of response buffers.

21. The microprocessor of claim 15, wherein said association information indicates one of said plurality of response buffers is allocated to receive said implicated cache line from a memory coupled to the microprocessor.

22. A microprocessor, comprising:
a write-allocate cache;
a plurality of response buffers, coupled to said cache, each for receiving a cache line allocated for a store operation missing in said cache, and each for maintaining a coherency status of said cache line;
a plurality of store buffers, each for storing an address specified by one of said store operations, and each for storing match information specifying which of said plurality of response buffers is maintaining said coherency status of said cache line implicated by said store operation address; and
control logic, coupled to said plurality of response buffers, for updating said cache with said coherency status of one of said plurality of response buffers specified by said match information in response to reception of said cache line into said specified one of said response buffers.

23. The microprocessor of claim 22, wherein each of said plurality of store buffers is also configured to hold store data specified by said store operation, wherein said control logic also updates said cache with said store data merged with said cache line.

24. A method in a microprocessor for alleviating the need to maintain coherency of cache line status between a store buffer and one of a plurality of response buffers, if the store buffer and the one of the plurality of response buffers store the same cache line address specified by a store operation, the method comprising:
determining whether the store operation needs a response buffer;
populating match bits, if the store operation does not need a response buffer, to specify that none of the plurality of response buffers is maintaining cache line status for a cache line implicated by the store operation; and
populating said match bits, if the store operation does need a response buffer, to specify which one of the plurality of response buffers is maintaining said cache line status for said cache line.

25. The method of claim 24, further comprising:
updating a cache in the microprocessor with said cache line status maintained in said one of the plurality of response buffers specified by said plurality of match bits if the store operation does need a response buffer.

26. The method of claim 25, further comprising:
updating said cache with a cache line status maintained in the store buffer if the store operation does not need a response buffer.

27. The method of claim 25, further comprising:
updating said cache line status maintained in said one of the plurality of response buffers specified by said plurality of match bits in response to events affecting said cache line status, prior to said updating said cache with said cache line status maintained in said one of the plurality of response buffers specified by said plurality of match bits.

* * * * *